3,502,715
METHOD FOR PRODUCING AND STABILIZING PERCARBOXYLIC ACID

Goro Inoue, Kyugo Tanaka, and Takashi Kobayashi, Tokyo, Japan, assignors to Asahi Kasei Kogyo Kabushiki Kaisha, Osaka, Japan, a corporation of Japan
No Drawing. Filed Jan. 18, 1966, Ser. No. 521,434
Claims priority, application Japan, Feb. 1, 1965, 40/5,077
Int. Cl. C07c 73/12
U.S. Cl. 260—502         2 Claims

ABSTRACT OF THE DISCLOSURE

A method for producing percarboxylic acids from aldehydes by oxidizing same in the presence of a heavy metal salt catalyst with an oxygen-containing gas at a temperature of 0°–50° C. and adding to the reaction mixture 0.01–10% by weight of a heavy metal sulfate.

---

This invention relates to a method for catalytically producing a solution of a percarboxylic acid, particularly of peracetic acid in an organic solvent by the use of oxygen or an oxygen-containing gas, to a method for stabilizing the thus produced solution and to the stabilized solution.

In the art for the production of peracetic acid, there have been hitherto known two methods: one from acetic acid anhydride and hydrogen peroxide and the other from acetaldehyde by oxidation. Recently, due to the abundant supply of relatively inexpensive acetaldehyde from newly developed petrochemical sources the method involving producing peracetic acid by the oxidation of acetaldehyde has been highlighted.

In the conventional method, a percarboxylic acid (hereinafter referred to as peracid) is produced by the liquid phase oxidation of an aldehyde, in the presence of a heavy metal salt, at room temperature or at a temperature close to room temperature and at atmospheric or super-atmospheric pressure of oxygen or air. In such an instance, the operation is carried out in a diluted solution of a suitable solvent such as an ester, ketone or hydrocarbon in order to avoid the danger of an uncontrollable reaction which may be caused by aldehyde monoperacylate. Aldehyde monoperacylate is formed by the exothermic reaction between peracid and unreacted aldehyde. It is a compound much more unstable than the peracid and readily decomposes particularly in the presence of a heavy metal salt. This not only reduces the yield of a peracid but also may proceed to uncontrollable extent. Furthermore, since the resultant peracid is also readily decomposed by the presence of heavy metal salt, the concentration or purification of peracid solution by distillation or rectification involves the possibility of great loss of the resultant peracid. In order to prevent the decomposition of peracid by such a heavy metal salt, there has been proposed an attempt to minimize the amount of heavy metal salt to be used as a catalyst and to carry out the reaction under a super-atmospheric pressure. However such an attempt is accompanied by another disadvantage because it not only brings about a reduction of the reaction velocity and subsequently, the conversion per unit time but also necessitates a prolonged retention time which, in spite of low catalyst concentration, causes the decomposition of peracid while ultimately not increasing the yield of peracid.

Various attempts have been proposed to stabilize the resultant peracid and peracid solution. For example the addition of a chelating agent to dissipate the decomposition ability of catalyst and stabilization with various salts of phosphoric acid or organic phosphate or the process disclosed in Japanese patent publication No. 25,658/1963 have been proposed. Said Japanese patent publication discloses a process for stabilizing an organic peracid by adding thereto a long chain alkyl ester of ortho or pyrophosphoric acid. However, every one of them not only hinders the decomposition activity of peracid but simultaneously also destroys the catalytic activity. When it is added during the oxidation of aldehyde, it entirely stops the reaction or exceedingly hinders the reaction. In this regard, stabilizers are effective only when added after the synthesis of peracid in order to prevent the decomposition due to the presence of heavy metal salt in the peracid solution. Accordingly there has not been found any substance which possesses the simultaneous functions of catalyst and stabilizer, i.e., a substance which is intentionally added at the time of peracid synthesis, and intended to remain in the peracid solution even thereafter as a stabilizer to thereby prevent loss of the peracid during the time of concentration and purification.

By the work of the present inventors, a method, the effect of which is worthy of special mention, has now been found. Namely as a result of studies regarding catalysts effective in peracid synthesis, it has now been found that a catalyst prepared by incorporating a slight amount of a metal sulfate into a known cobalt catalyst affords a higher yield in the oxidation of aldehyde by oxygen, makes the stability of the resultant peracid solution last longer and holds down the decomposition loss at the time of concentration or distillation of peracid solution when compared with a catalyst containing a conventional cobalt type catalyst alone.

According to the present invention, an aldehyde is dissolved in an inert solvent such as ethyl acetate or acetone, a heavy metal catalyst such as an iron-, cobalt-, or manganese-salt is added to the resultant solution in an amount (expressed in terms of the metal) of about 0.01 to 100 p.p.m., a metal sulfate such as is hereinafter described, is further added to the solution in an amount of about 0.01 to 10 percent per solution and oxidation is carried out at atmospheric pressure or superatmospheric pressure, at a temperature of 0 to 50° C. particularly 20 to 45° C. in the liquid phase with use of oxygen or an oxygen-containing gas. By such a procedure it is confirmed that a great increase in the yield of peracid can be obtained compared with the case where the oxidation is carried out under the same conditions without the addition of a metal sulfate. Further it is confirmed that the oxidation velocity is extremely fast, reduction of the oxidation velocity due to the addition of metal sulfate does not occur and even when such a solution produced by the reaction or a solution after the concentration procedure which contains highly concentrated peracid is left in the presence of the metal sulfate, the decomposition of peracid is notably hindered. If a metal sulfate is not present under such conditions, there will be a notable decomposition of peracid, and violent and rapid reduction of peracid concentration occurring which results in not only the loss of peracid but also the possibility of danger such as explosion or the like. Moreover, since such a metal sulfate exists in suspended form in the solution, it is advantageous in that it can be reused after being filtered or as is if so required.

The method of the present invention can be applied to all the processes heretofore known for the production of peracid by the liquid phase oxidation of an aldehyde. Regarding the processes of the liquid phase oxidation of aldehyde, there have been known heretofore the following methods: in one method, an aldehyde is dissolved in an inert solvent and oxidized in one step to peracid in the presence of a soluble heavy metal salt catalyst, at atmospheric or superatmospheric pressure and at a temperature of 0 to 50° C. (British Patents 815,353, 832,337, and 864,803) and in another method. An aldehyde is converted by oxygen into aldehyde monoperacylate, a precursor of peracid in the presence of a solvent, under the influence of light or ozone and at a temperature less than 0° C. in the first step and then the latter is pyrolyzed to peracid under a reduced pressure in the second step. [JACS 79,5982 (1957).] The method of the present invention is applicable to both methods, but it is particularly effective in the one step process, in view of the foot that it improves the yield of peracid to a great extent.

In commercial practice, the one step process appears advantageous, compared with the two step process in the point that the former has fewer reaction steps and the latter must include the second step involving a possible danger of explosion. Nevertheless, the reason that the two step process has been predominantly used, lies in the fact that the yield of peracid synthesis is low and such additional steps as inactivation of catalyst and separation of the same by distillation are required in order to prevent the decomposition of the resultant peracid caused by the presence of catalyst in a reacted solution and a reduction of yield is also inevitable in the one step process. Further, mentioned above, even if an attempt is made to reduce the decomposition of peracid by the presence of a heavy metal, it also surpresses the oxidation reaction itself, resulting in a reduction of peracid yield, and of reaction velocity and reduction of yield of the total reaction.

For the foregoing reasons, if a method which increases the yield of synthesis but does not promote the decomposition of peracid after the reaction, were discovered, the one step process would become a very advantageous process for producing peracid.

The present invention provides a method which satisfies the above-mentioned two requirements. In other words, by the addition of the slightest amount of a metal sulfate in the reaction of the conventional one step process, the yield of peracid is increased and the decomposition loss of the resultant peracid is exceedingly reduced even when the peracid is exposed to severe conditions.

Aldehydes used in the present method include aliphatic aldehydes such as acetaldehyde, propionaldehyde and aromatic aldehyde such as benzaldehyde. Solvents useful in the present method include esters, ketones and other organic solvents inert to the reaction mixture, particularly methyl acetate, ethyl acetate, benzene, acetonitrile, and the like. Illustrative catalysts include heavy metal salts soluble in the reaction system, particularly salts of an acid selected from the group consisting of acetic acid, nitric acid, hydrochloric acid, naphthenic acids and acetyl acetone of and a metal selected from the group consisting of cobalt, iron, manganese, nickel and the like are effective. The amount of these metal salts to be added is generally in the range of 0.01 to 100 p.p.m. as indicated by the weight of metal per total amount of reacted solution. Beside the above-mentioned additives, metal sulfates such as iron-, cobalt-, copper-, magnesium-, and nickel-sulfate or the like in an amount of about 0.01 to 10 percent preferably 0.1 to 10 percent (the amount varies according to material) is added in the present method by which the yield of peracid is increased and the resultant peracid can be stabilized even after the reaction. However the amount of sulfate added in the present method is not necessarily critical. The reaction pressure varies depending upon the reaction temperature and the kind of aldehyde used but the reaction carried out under pressure is advantageous from the standpoint of reaction velocity. The reaction temperature is preferably in the range of 0 to 50° C., particularly 20 to 45° C.

The features of the present method are summarized as follows:

(i) Incorporation of a metal sulfate in the liquid phase oxidation of an aldehyde increases the selectivity of peracid production and speeds up the oxidation to a great extent.

(ii) Incorporation of a metal sulfate in a reacted solution which is left standing or in a solution being concentrated, or in a concentrated solution in storage surpresses the decomposition of peracid.

(iii) Addition of a metal sulfate to a peracid solution prepared by other known methods increases the stability of the peracid.

(iv) Since the additives of the present invention exist in the solution in a state of suspension, they can be filtered if so required.

The following examples are given to illustrate the present invention.

A CONTROL

Into a 200 ml. autoclave, 10 g. of acetaldehyde, 90 g. of ethyl acetate and 3 mg. of cobalt nitrate were charged and after flashing the autoclave with nitrogen, heating was started. When the temperature reached 35° C., the reaction was started by introducing oxygen with agitation at a pressure of 10 kg./cm.$^2$. The absorption of oxygen commenced immediately and actually stopped in 40 minutes. The autoclave was quickly cooled and the contents were taken out while cooling. Analysis of the contents by gas chromatography, chemical analysis, etc. revealed that almost all the acetaldehyde charged had reacted, the yield of resultant peracid relative to acetaldehyde was 63 percent and the greater portion of the remaining part was acetic acid accompanied by a trace of carbon dioxide and methane.

EXAMPLE 1

To the same charge solution as in the control, 0.1 g. of ferrous sulfate was added and the reaction was carried out under the same conditions is in the control. The absorption of oxygen commenced immediately and stopped in 40 minutes during which time the same absorption velocity as in the control was observed. The autoclave was immediately cooled and the contents were analyzed, which analysis revealed that there was hardly any unreacted aldehyde. The yield of resultant peracid was 78 percent. From the above example it can be seen that ferrous sulfate in the reaction system improves the yield of peracid by a considerable margin while retaining the same oxidation velocity.

EXAMPLE 2

Into a precooled 200 ml. autoclave, 15 g. of acetaldehyde, 85 g. of acetone, 5 mg. of ferrous acetate and 0.2 g. of aluminum sulfate were charged. After flashing same with nitrogen, the temperature of the system was elevated to 35° C. Then oxygen was blown in under a pressure of 5 kg./cm.$^2$ with stirring. The reaction commenced immediately and the reaction temperature rose to 40° C. By cooling from the outside, a temperature of 40° C. was maintained for 20 minutes and thereafter cooling was carried out quickly. After being cooled, the reaction product was taken out and analysed. In the off-gas, traces of carbon dioxide, methane, acetaldehyde, acetone, etc. were observed. Analysis of the peracid in the reaction product revealed that the yield of peracid was 86 percent in contrast to 72 percent obtained in the case where no aluminum sulfate was added under the same conditions.

EXAMPLE 3

Into a precooled 200 ml. autoclave, 6 g. of acetaldehyde, 94 g. of acetonitrile, 5 mg. of cobalt-acetylacetone, and 0.05 g. of ferrous sulfate were charged. After flashing same with nitrogen, stirring was started at a reaction temperature of 25° C. using pressurized oxygen. The absorption of oxygen commenced immediately and stopped in about 40 minutes after which the autoclave was quickly cooled and the contents taken out and analysed. The result showed 73 percent yield of peracid. The yield of peracid was only 65 percent in the case where the oxidation was carried out under the same conditions but without ferrous sulfate.

EXAMPLE 4

Ethyl acetate solutions each containing 15 percent acetaldehyde were prepared in several 50 ml. microreactors. To each of these solutions, 6 p.p.m. of cobalt acetate (expressed as cobalt) were added. Then ferrous sulfate, aluminum sulfate and nickel sulfate were added to each of the solutions in amounts of each 0.1 percent relative to the charged liquid. Beside these 3 solutions another solution containing no sulfate was prepared as a control. The 4 solutions were immersed in a water bath maintained at a temperature of 25° C. and pressurized with 5 kg./cm.$^2$ oxygen, then stirring was started. Oxygen was supplied successively to carry out the reaction at a constant pressure for 30 minutes at a temperature of 30° to 40° C. and then the solutions were quickly cooled. Concentrations of each solutions were analysed. Each was concentrated or diluted with ethyl acetate to make the concentration 20 percent by weight. Thereafter each was immersed in a bath maintained at a temperature of 45° C. and changes of concentrations relative to times were investigated. The results are shown in the following table.

| Time | Percent | | | |
|---|---|---|---|---|
| | Not added | Ferrous sulfate | Aluminum sulfate | Nickel sulfate |
| 0 | 20 | 20 | 20 | 20 |
| 1 | 12 | 18 | 17 | 16 |
| 3 | 8.0 | 15 | 15 | 13 |
| 5 | 5.5 | 12 | 12 | 10 |
| 8 | 3.4 | 10 | 9.6 | 6.7 |

It can be seen from the foregoing table that the metal sulfates which were effective in improving the yield of peracid in the synthesis were in the solution and also showed effectiveness in preventing peracid decomposition.

EXAMPLE 5

Into the same reaction apparatus as in the control, a 15 percent acetaldehyde solution in ethyl acetate was introduced and oxidized with oxygen at a temperature of 25° C. in the presence of 10 p.p.m. of cobalt acetate to obtain an 18 percent by weight peracid solution. The resultant solution was divided into several portions and each portion was introduced in different glass vessels which had been perfectly cleaned with use of a cleaning solution consisting of potassium bichromate and sulfuric acid. To each portion, 0.1 percent by weight of various metal sulfates were added and the decomposition of peracid was investigated while each portion was maintained at a temperature of 45° C.

The results are shown in the following table.

| Time | Percent | | | |
|---|---|---|---|---|
| | Not added | Ferrous sulfate | Ferric sulfate | Aluminum sulfate |
| 0 | 18.0 | 18.0 | 18.0 | 18.0 |
| 1 | 16.5 | 18.0 | 18.0 | 18.0 |
| 2 | 15.2 | 17.6 | 17.4 | 17.7 |
| 4 | 8.1 | 15.9 | 15.6 | 16.5 |
| 7 | 2.7 | 13.8 | 13.3 | 14.1 |

From the foregoing table, it can be seen that the metal sulfate also simultaneously prevents the decomposition loss of peracid due to the presence of heavy metal.

What we claim is:

1. A stabilized solution of a percarboxylic acid in an inert solvent, said percarboxylic acid being selected from the group consisting of peracetic, perpropionic and perbenzoic acids, said solution containing a heavy metal salt selected from the group consisting of the acetates, nitrates, hydrochlorides, naphthenates and acetyl acetonates of cobalt, iron, manganese and nickel and from 0.01 to 10 percent by weight of a metal sulfate selected from the group consisting of iron, cobalt, copper, magnesium, nickel and aluminum sulfate.

2. A method of producing a percarboxylic acid from an aldehyde selected from the group consisting of acetaldehyde, propionaldehyde and benzaldehyde, said method comprising oxidizing the aldehyde with oxygen or an oxygen containing gas at a temperature of 0 to 50° in an inert solvent in the presence of (1) a heavy metal salt catalyst selected from the group consisting of acetic acid, nitric acid, hydrochloric acid, naphthenic acids and acetyl acetone, said metal being selected from the group consisting of cobalt, iron, manganese and nickel and (2) from 0.01 to 10 percent by weight of a metal sulfate selected from the group consisting of iron-, cobalt-, copper-, magnesium-, nickel- and aluminum sulfate.

References Cited

UNITED STATES PATENTS

| 2,335,856 | 12/1943 | Hooft | 260—610 |
| 3,228,977 | 1/1966 | Sennewald et al. | |
| 2,366,725 | 1/1945 | Gardner | 252—440 |
| 3,052,727 | 9/1962 | Huber | 252—440 |
| 3,118,001 | 1/1964 | Riemenschneider | 252—440 |
| 3,119,875 | 1/1964 | Steinnet et al. | 252—440 |

FOREIGN PATENTS 6409889  1965  Netherlands.

References Cited

Koninklijke, "Chem. Abstract," vol. 61, pp. 4241–42 (1964).

LEON ZITVER, Primary Examiner

W. B. LONE, Assistant Examiner